United States Patent [19]

Konstant

[11] 3,726,414
[45] Apr. 10, 1973

[54] STORAGE RACK AND BEAM FOR USE THEREIN
[75] Inventor: Anthony N. Konstant, Mount Prospect, Ill.
[73] Assignee: Speedrack Inc., Skokie, Ill.
[22] Filed: June 28, 1971
[21] Appl. No.: 157,339

[52] U.S. Cl.....................................211/148, 29/477
[51] Int. Cl................................................A47f 5/00
[58] Field of Search.....................211/148, 176, 177;
108/109, 107, 106, 108, 110, 101; 248/243;
72/368, 367, 51, 52, 49; 29/477, 482;
52/720; 287/189.35, 54 C, 54 A

[56] References Cited

UNITED STATES PATENTS

| 1,344,105 | 6/1920 | Vance | 72/368 |
| 1,942,445 | 1/1934 | Oldham | 29/477 |
| 3,009,582 | 11/1961 | Degener | 211/177 |
| 3,042,221 | 7/1962 | Rasmussen | 211/148 |
| 3,153,990 | 10/1964 | Kunzog | 29/477 UX |
| 3,186,527 | 6/1965 | Konstant et al. | 211/148 X |
| 3,447,017 | 5/1969 | Kerstetter | 29/477 X |
| 3,463,325 | 8/1969 | Zagotta et al. | 211/148 |
| 3,587,483 | 6/1971 | Konstant | 211/148 X |

Primary Examiner—Ramon S. Britts
Attorney—Fitch, Even, Tabin & Luedeka

[57] ABSTRACT

An improved beam shape for use as a horizontal load-bearing member in a storage rack of the type adapted to support horizontal decking upon spaced parallel beams. The beam configuration provides an upper wall, narrower in width than the bottom wall, formed from a pair of folded elements which present abutting arcuate edges along which a longitudinal weld line completes the tubular shape. The tubular shape is particularly adapted for fabrication via an automatic rolling and welding process, and the specific configuration of the two rolled portions which form the upper surface add improved stiffness and overall strength to the beam shape.

9 Claims, 4 Drawing Figures

INVENTOR
ANTHONY N. KONSTANT

Fitch, Even, Tabin & Luedeka
ATTYS.

STORAGE RACK AND BEAM FOR USE THEREIN

This invention relates generally to storage racks and more particularly to a storage beam of improved construction and to a method of making same.

Storage racks of various designs are presently in use for storing a variety of materials in warehouses and other storage areas. One type of storage rack commonly used for supporting heavier materials in storage areas includes a plurality of vertical posts, at least some of which are interconnected to one another to form end frames, and pairs of horizontal beams attached to the posts which beams carry a decking upon which the stored items rest. To accommodate such decking, it has been found desirable to include an intermediate ledge in the beam shape at a level below the top of the beam to provide secure support for the decking and to restrain the decking against lateral movement by means of a vertical shoulder which extends upward from the ledge to the top surface of the beam. Storage racks employing beams of this general type are shown in U. S. Pat. No. 2,932,368, issued Apr. 12, 1960 to Burt E. Schell, Jr.

Although storage racks incorporating such beams which support wooden decking have been used satisfactorily in many installations, improved constructions for storage rack beams are always being sought. These beams have usually been manufactured from two separate pieces of steel which has required assembly in a manner to assume close longitudinal alignment of the two pieces. Beams incorporating such a vertical shoulder and adjacent ledge have also been rolled from a unitary tube of steel. Improved storage rack beam shapes and methods for fabricating such beams are desired.

It is an object of the present invention to provide an improved beam structure for use in a storage rack or the like.

Another object of the invention is to provide an improved beam shape which can be rolled from a flat piece of steel.

A further object of the invention is to provide an improved method of making a storage rack beam which has excellent strength and stiffness per unit weight.

Still another object of the invention is to provide an improved storage rack construction utilizing beam shapes of this design.

Other objects of the invention will become apparent to those skilled in the art from the following detailed description when read in conjunction with the accompanying drawings wherein.

Figures 1, 2, 3, 4:
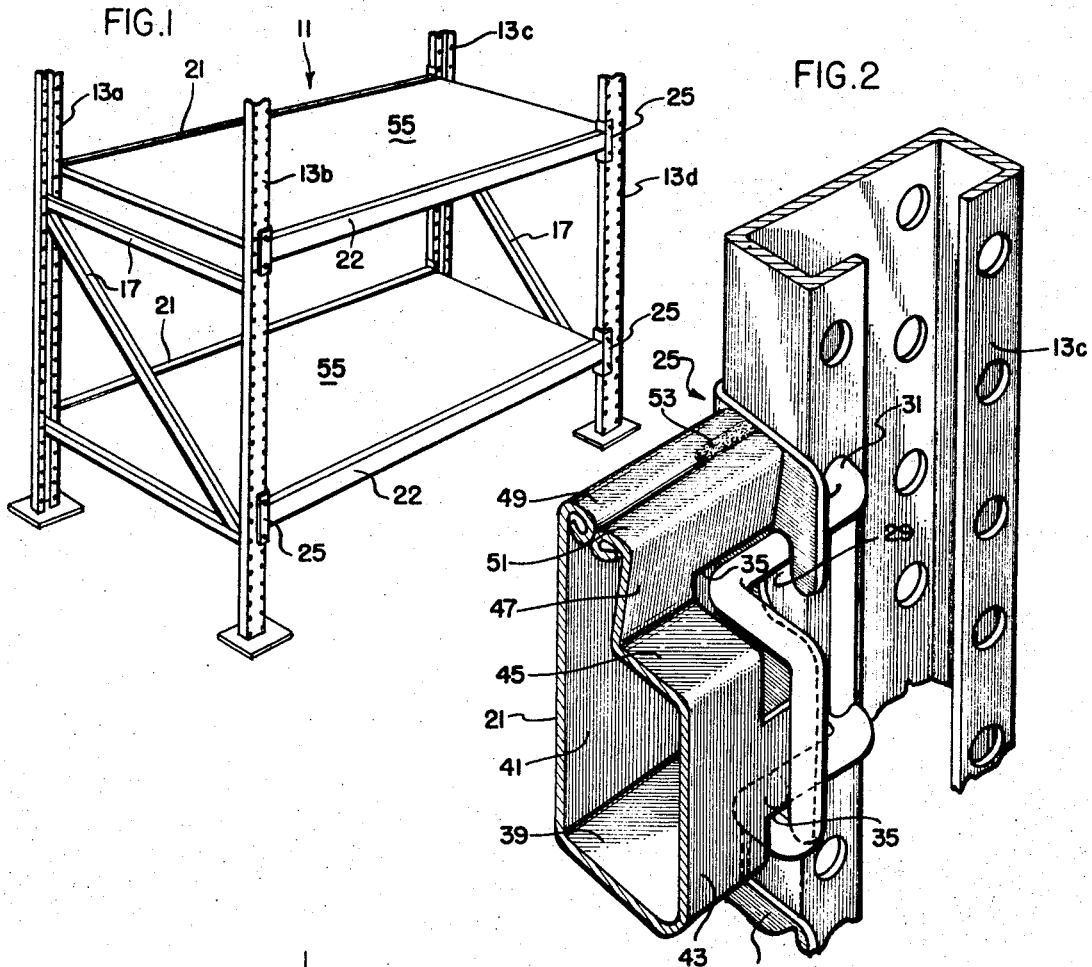
FIG. 1 is a perspective view of a storage rack embodying various features of the invention.
FIG. 2 is an enlarged fragmentary perspective view of a portion of the storage rack shown in FIG. 1, illustrating the beam construction.
FIG. 3 is an enlarged fragmentary sectional view taken along the line 3—3 of FIG. 2.
FIG. 4 is a diagrammatic view showing the storage rack beam illustrated in FIGS. 1-3 as it is being fabricated.

Very generally, a storage rack 11 is illustrated which has four upstanding vertical posts, 13a, 13b, 13c and 13d, each of which is generally C-shaped in horizontal cross-section. The posts are interconnected in pairs by braces 17 to form what are commonly referred to as end frames. The braces 17 may be welded or affixed in any suitable manner to the upstanding posts to form the end frames which contribute rigidity to the storage rack structure. Horizontal beams 21 extend between posts 13a and 13c, and horizontal beams 22 extend between posts 13b and 13d.

The beams 21 and 22 are connected to the posts 13 by connectors 25 of the type generally shown in aforementioned U. S. Pat. No. 2,932,368. These connectors 25 utilize angle plates 27 which are fixed, as by welding, to the ends of the beams 21 and 22 and which have slots 29 for engaging pin connectors 31. The posts 13 are each provided with two rows of vertically spaced holes 33 extending completely therethrough which holes accept straight portions of the pin connectors 31 and permit the connectors to be located at the desired vertical level. Cutouts 35 are provided in the beams 21 and 22 to provide clearance for these pin connectors 31 at each end of the beam adjacent where it is welded to the angle plate 27 if it is desirable for the top of the beam to be flush with the top of angle plate 27.

As best seen in FIG. 2, the beam 21 is formed of a single sheet or strip of steel and includes a bottom wall 39 extending horizontally between a pair of upstanding vertical side walls 41 and 43. An inturned shelf or ledge 45 is formed at the upper end of the shorter side wall 43, and a vertical shoulder 47 extends upward from the ledge 45 to the top surface of the beam. The top of the beam 21 is formed by a pair of similar top wall elements 49 and 51 each of which is turned under upon itself to provide facing and abutting arcuate rolled edges. The tubular configuration of the beam 21 is completed by welding the two top wall elements 49 and 51 to each other by a longitudinal weld 53 running from one end of the beam to the other. A suitable welding technique is used, as for example, by locating a ½ to ¾ inch weld about every 5 inches of length.

In the storage rack 11 illustrated, a horizontal deck 55 extends between the pairs of the beams 21 and 22 at the same vertical level, with the opposite edges of the deck resting on the ledges 45 in the recesses provided in the beams. Usually the thickness of the deck 55 is about equal to the height of the upstanding shoulder 47 so that the upper surface of the deck is nearly flush with the top surfaces of the beams 21 and 22. As best seen in FIGS. 2 and 3, the shoulder 47 is not vertical but is disposed at an angle of about 85° to the intermediate ledge 45. If desired, the angle of inclination may be as small as about 75°. As a result of this offsetting of the shoulder 47, the curvature of the steel sheet at the point of transition between the ledge 45 and the shoulder 47 does not interfere with the lower edge of the decking 55. Consequently, a tight fit can be obtained between the lateral edge of the decking 55 and the upper portion of the shoulder 47 which can add to the stability of the storage configuration.

The preferred method of manufacture of the beam 21 is shown in FIG. 4. The diagrammatic illustration shows several of the steps in a progressive rolling operation which is preferably employed to gradually transform a single flat sheet of steel into the desired beam cross sectional configuration. By suitably adjusting the rolling apparatus, beams may be made in several depths and widths using only a single set of tools.

In the rolling operation, the longitudinal edges of the sheet are initially begun to be bent upward along lines which are subsequently the approximate lines along which the welding is performed in completing the final beam configuration. Likewise, bending is carried out along the lines which define the attached edges of the top wall elements 49 and 50. Moreover, two bends are also begun along lines which define the intermediate ledge portion 45 of the beam. As should be apparent from FIG. 4, the rolling of the lateral edges of the sheet in order to form the top turned-under sections is complete prior to the bending of the sheet along the lines which define the bottom wall 39 and the two upstanding side walls 41 and 43.

Fabrication in the above manner facilitates the formation of the shoulder 47 at an angle of less than 90° to the ledge 45. Moreover, rolling of the beam in this sequence has been found to provide precise alignment and formation of the top wall elements 49 and 51. Desirably, when the formation of the tube is complete, it is fed directly from the final station of the rolling operation through a continuous welding machine which automatically applies a short weld, for example from ½ to ¾ of an inch, each 5 to 6 inches of length of the beam. The concept of rolling a flat strip in this manner to produce a line of junction centrally within the upper flange of the beam also facilitates subsequent continuous automatic welding to complete the tubular formation as a part of a completely automatic fabrication installation.

In addition to facilitating the fabrication of the beam, the improved design provides a beam having unexpectedly greater strength, as compared to other tubular beams of this general design which are employed in storage racks and the like. When a tubular beam is loaded, the upper surface of the beam is placed in compression and is one of the most important members in carrying the compressive loading in the beam. By rolling the edges of the sheet from which the beam is fabricated back upon themselves in the creation of the top wall elements 49 and 51, it is found that a surprisingly large increase in stiffness of the beam is obtained. As a result, it is found that the beam 22 exhibits load-bearing strength equal to that shown by beams made of higher gauge steel having generally similar tubular design but without the rolled top wall elements. Moreover, by proportioning the top wall elements 49 and 51 so that the total width is equal to the width of the bottom wall 39 plus or minus 20 percent the most efficient use is made of the steel in this beam shape.

To obtain the desired stiffening effect, the bending or folding at this point should take best advantage of the strength of the steel. From this standpoint, it is believed that the radius of curvature of the bend should not fall below a certain minimum, nor exceed a certain maximum, relative to the thickness of the steel being employed. To obtain the desired stiffening effect, it has been found the radius of curvature of the interior surface of bent-under portions of the top wall (Ref. A in FIG. 4) elements should not be less than the thickness of the steel and should not exceed 3½ times the thickness of the steel. For example, when 14 gauge steel is used (having a thickness of about 0.075 inch) the radius of curvature, measured about the interior surface of the bend, is preferably about 7/64 inch.

Above or below the maximum and minimum relative values given, it has been found that the stiffening effect is substantially diminished. Below the minimum, the structural strength of the steel may be adversely affected, and above the maximum, the location of the bent-under portions approaches the neutral axis of the beam and no longer efficiently stiffens the beam.

It has been found that the combination of the location of the pair of folds, each of which are bent more than 180°, at the center of the top surface of the beam 21 and the joinder thereof longitudinally throughout the length of the beam contributes a substantial additional amount of stiffness and load-bearing compressive strength to the beam, as compared with a beam of similar shape wherein the upper surface is formed of two flat sections of steel merely lapped one atop the other. This contribution results from the cold working of the metal as well as from the configuration in the region where the bends are made. The stiffness and strength provided by the upper wall configuration permits cutouts 35 to be located in the ledge 45 and the bottom wall 39 to provide clearance for the connector pins 31.

Various modifications of the invention as will become apparent to those skilled in the art from the foregoing description and accompanying drawings are intended to fall within the scope of the appended claims.

Various of the features of the invention are set forth in the claims which follow.

What is claimed is:

1. A storage rack comprising at least one pair of spaced apart horizontal beams, vertical posts at the ends of said beams in parallel relationship to each other, means at both ends of each of said beams interconnecting said beams and said posts, each of said beams being made from a single sheet of structural material and having a bottom wall, first and second upstanding vertical side walls, said first wall extending upward to the top surface of said beam, said second upstanding side wall terminating substantially short of said top surface and having attached thereto an inwardly extending horizontal ledge, an upstanding shoulder attached to the interior edge of said ledge and extending upward to the top surface of said beam, a pair of top wall elements approximately equal in width extending toward each other from the upper edges of said first upstanding wall and said shoulder, each of said top wall elements being turned under upon itself to provide arcuate edge surfaces which substantially abut each other longitudinally, the total width of said top wall elements including said turned under portions being equal to the width of said bottom wall plus or minus about 20 percent, and weld means extending longitudinally of said beam joining said arcuate edges to complete a tubular shape having excellent stiffness and strength per unit weight, said beams being located with said shoulders facing each other with said ledges disposed to support flat decking extending therebetween.

2. A storage rack in accordance with claim 1 wherein said shoulder is disposed at an angle of about 85° or less to said horizontal ledge.

3. A storage rack in accordance with claim 1 wherein said turned-under portions are each bent more than about 180°.

4. A storage rack in accordance with claim 1 wherein the radius of curvature of the interior surface of said arcuate edge is between about 1 and 3.5 times the thickness of said structural material.

5. A storage rack in accordance with claim 1 wherein said interconnecting means include connecting pins and wherein cutouts are provided in said bottom wall, in said second side wall and in said ledge to provide clearance for said pins.

6. A beam made from a single sheet of structural material for use in storage racks or the like as one of a pair of parallel horizontal beams which may support a flat deck therebetween, said beam having a bottom wall, first and second upstanding vertical side walls, said first wall extending upward to the top surface of said beam, said second upstanding side wall terminating substantially short of said top surface and having attached thereto an inwardly extending horizontal ledge, an upstanding shoulder attached to the interior edge of said ledge and extending up to the top surface of said beam, a pair of top wall elements approximately equal in width extending toward each other from the upper edges of said first upstanding wall and said shoulder, each of said top wall elements being turned under upon itself to provide arcuate edge surfaces which extend longitudinally and substantially abut each other, the total width of said top wall elements including said turned under portions being equal to the width of said bottom wall plus or minus about 20 percent and weld means extending longitudinally of said beam joining said arcuate edges to complete the tubular beam shape which has excellent stiffness and strength per unit weight.

7. A beam in accordance with claim 6 wherein said shoulder is disposed at an angle of about 85° or less to said horizontal ledge.

8. A beam in accordance with claim 6 wherein said turned under portions are each bent more than about 180°.

9. A beam in accordance with claim 6 wherein the radius of curvature of the interior surface of said arcuate edges is between about 1 and 3.5 times the thickness of said structural material.

* * * * *